(12) United States Patent
Keirinbou

(10) Patent No.: US 6,285,893 B1
(45) Date of Patent: Sep. 4, 2001

(54) PORTABLE RADIO DEVICE

(75) Inventor: Hisashi Keirinbou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/244,191

(22) Filed: Feb. 4, 1999

(30) Foreign Application Priority Data

Feb. 9, 1998 (JP) .................................. 10-044526

(51) Int. Cl.$^7$ .............................. H04B 1/38; H04B 1/04; H04B 1/06; H04B 7/00
(52) U.S. Cl. ..................... 455/575; 455/575; 455/129; 455/269; 455/90
(58) Field of Search .................... 455/90, 127, 129, 455/269, 550, 575, 562, 100, 351, 277.1, 278.1; 340/225.44, 426, 328, 334

(56) References Cited

U.S. PATENT DOCUMENTS

| 4,584,709 | * | 4/1986 | Kneisel et al. ................ 455/78 |
| 5,276,920 | * | 1/1994 | Kuisma .......................... 455/101 |
| 5,493,704 | * | 2/1996 | Grangeat et al. .............. 455/90 |
| 5,530,919 | * | 6/1996 | Tsuru et al. ................... 455/90 |
| 5,678,202 | * | 10/1997 | Filimon et al. ............... 455/89 |

FOREIGN PATENT DOCUMENTS

| H06-140963 | | 5/1994 | (JP) . | |
| H09-247031 | | 9/1997 | (JP) . | |
| 09247031 A | * | 9/1997 | (JP) ................. | H04B/1/38 |
| H10-028169 | | 1/1998 | (JP) . | |
| 10028169A | * | 1/1998 | (JP) ................. | H04M/1/00 |
| 410028069A | * | 1/1998 | (JP) ................. | H04B/1/16 |
| 10-271031 | | 10/1998 | (JP) . | |
| 11-163616 | | 6/1999 | (JP) . | |
| 9700591A | * | 9/1997 | (SE) ................ | H01Q/1/27 |

OTHER PUBLICATIONS

Japanese Patent Laid–OpenGgazette No. 60123/81 (JP,A, 56–60123) as for English abstract of Japanese Patent Laid–open Gazette 46892/83 (JP,A,58–46892), dated May 23, 1981.
Japanese Patent Laid–Open Gazette No. 6927/91 (JP,A, 3–6927), dated Jan. 14, 1991.
Japanese Patent Laid–Open Gazette No. 200889/95 (JP,A, 7–200889), dated Aug. 4, 1995.
Japanese Patent Laid–Open Gazette No. 200897/95 (JP,A, 7–200897), dated Aug. 4, 1995.

* cited by examiner

Primary Examiner—Daniel Hunter
Assistant Examiner—Meless Zewdu
(74) Attorney, Agent, or Firm—Scully, Scott, Murphy & Presser

(57) ABSTRACT

Two sensors 2, 3 are provided for detecting an interception object on respective different surfaces of device housing 1 of a portable radio device. Two antennas 4, 5 are provided in the state of having directivity in respective different directions in device housing 1. Also provided are switching unit 8 for selectively connect antenna 4 or 5 to transmit-receive unit 7 and control unit 6 for controlling the same. Detection signals of respective sensors 2, 3 are applied to control unit 6 in the state that device housing 1 is fitted to a human body, the fitting direction of device housing 1 is determined through the detection signals, and switching unit 8 is controlled such that one of antennas 4, 5 on the side not contact with the human body is selected.

7 Claims, 4 Drawing Sheets

PORTABLE RADIO DEVICE

BACKGROUND OF THE INVENTION

1. Field of the Invention

The present invention relates to a portable radio device removably fitted to a mobile body, more particularly, to a portable radio device fitted to a mobile body which is a human body.

2. Description of the Related Art

In a mobile radio communication system, a radio device, such as a radio-paging device (pager) or a portable telephone, which is of a portable type and is not fixed to a mobile body, has been popularized in recent years, besides a communication device fixedly provided in a mobile body such as a vehicle. Furthermore, a portable radio device is used not only for ringing or voice communication but also for various data transmission.

Generally, in a mobile radio communication system, the communication quality is largely affected by interference due to the multiple radio wave paths or fading associated with the movement of a mobile body and so on, and then various countermeasures have been disclosed for suppressing such interference.

For example, in "Mobile Radio Reception System" disclosed in Japanese Patent Application Laid-Open No. 58-46892 (JP 58-46892/1983), three or more directional antennas, each having directivity within a limited angular range in a horizontal plane, are disposed such that each antenna forms an antenna directivity pattern in a respectively different directions and as a whole to be nondirectional. The signal strength received from each of these antennas is compared with a predetermined threshold to switch the output from each antenna, thereby performing diversity reception. In the application of this system, the antenna are necessarily integrated with a receiver. A radio device having antennas fixedly mounted to a mobile body such as a vehicle is the most appropriate.

Additionally, "Portable Radio Device" disclosed in Japanese Patent Application Laid-Open No. 3-6927 (JP36927/1991) comprises an antenna and components having a removable metal portion, such as a battery, and a single housing. For the purpose of suppressing the affect of the mounting state of those components on the antenna characteristics, the portable radio device is provided with determining means for determining the mounting state of the components and control means for controlling various constants which define the characteristics of the antenna in accordance with the determined mounting state of the components.

On the other hand, a small device among the above-mentioned portable radio devices, for example a portable radio receiver for broadcasting or a portable telephone, typically has a single antenna provided inside or attached outside a housing of the communication device. While moving time along, the entire communication device is used while being fitted to a human body by putting the entire communication device including the antenna in a bag or a pocket of clothing, or by holding the device in a holding case attached to a belt.

When the portable radio device is fitted to the human body as described above, typically it is not specified which surface of the housing of the portable radio device is disposed closely to the human body. If the surface of the housing on which the antenna is disposed is close to the human body, the directivity of the antenna may be disturbed by the human body to deteriorate the reception sensitivity and the transmission incident power.

SUMMARY OF THE INVENTION

It is an object of the present invention to provide a portable radio device which can obtain a favorable state of radio wave transmission and reception when the portable radio device is fitted for use to a mobile body which affects the propagation of the radio wave, especially to a human body, with a surface of the device being fitted to the mobile body.

To achieve the above object, a portable radio device according to the present invention has a radio communication unit including at least one of either a transmitter or a receiver for radio waves; a device housing for holding the radio device and removably fitted to a mobile body; a plurality of antennas dispersedly disposed at positions away from one another in the device housing; a plurality of sensors provided corresponding to each of the plurality of antennas and for detecting an object close to the device housing; and a switching circuit for comparing detection results of the respective sensors and selectively switching one of the antennas to be connected to the radio communication unit.

The sensor may include one of an optical sensor, a strain sensor, and a temperature sensor or a combination of two or more of the above sensors.

The optical sensor is a reflection type optical sensor having a light emitting device and a light detection device, in which light is emitted from the light emitting device in a specific direction to detect the reflected light from a interception object at with light detection device. The strain sensor is a pressure sensor for sensing, when the device is contacted with another object, the contact pressure with the strain of the contact surface. The temperature sensor detects the temperature such as the temperature radiated from a human body to sense the approaching of a heat source.

The switching circuit receives detection outputs from the plurality of sensors, determines the fitting surface of the device housing contact with the mobile body, and selects one of the antennas corresponding to the fitting surface when the power of the radio communication unit is put on.

The switching circuit may periodically receive the detection outputs from the plurality of sensors at certain time intervals or occasionally when indication input is received.

As described above, the present invention has effects that the directivity of the antennas properly functions, a favorable transmission state of radio waves can be obtained, and an improvement in the reception sensitivity and the transmission characteristics can be achieved by detecting the fitting direction of the device housing with respect to the mobile body using a plurality of sensors, selecting the optimal antenna corresponding to the detection result, and connecting the selected antenna to the communication circuit.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENT

Figure 1:
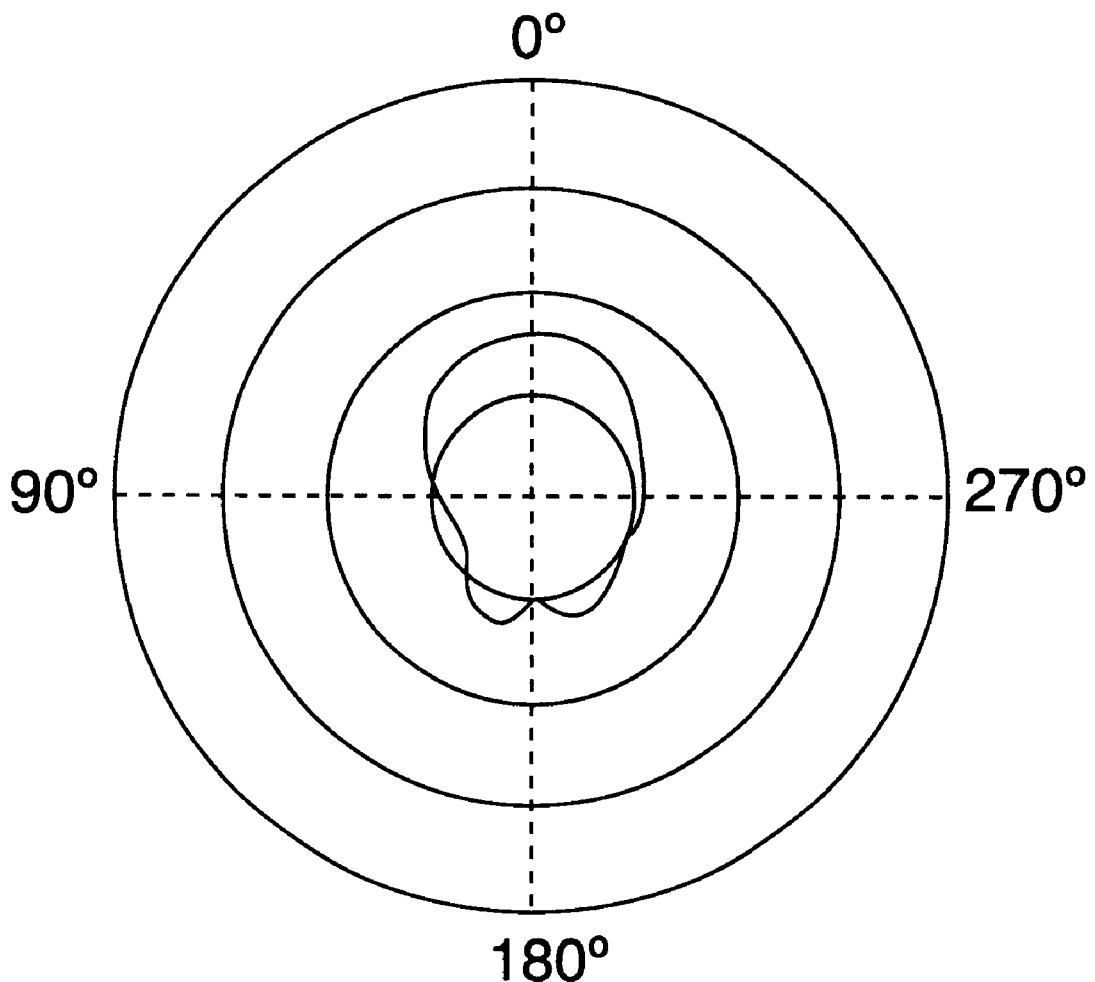
FIG. 1 is an explanatory view for an specific example of the incident power pattern of the transmitted radio wave from a portable radio device of a prior art.
Figure 2:
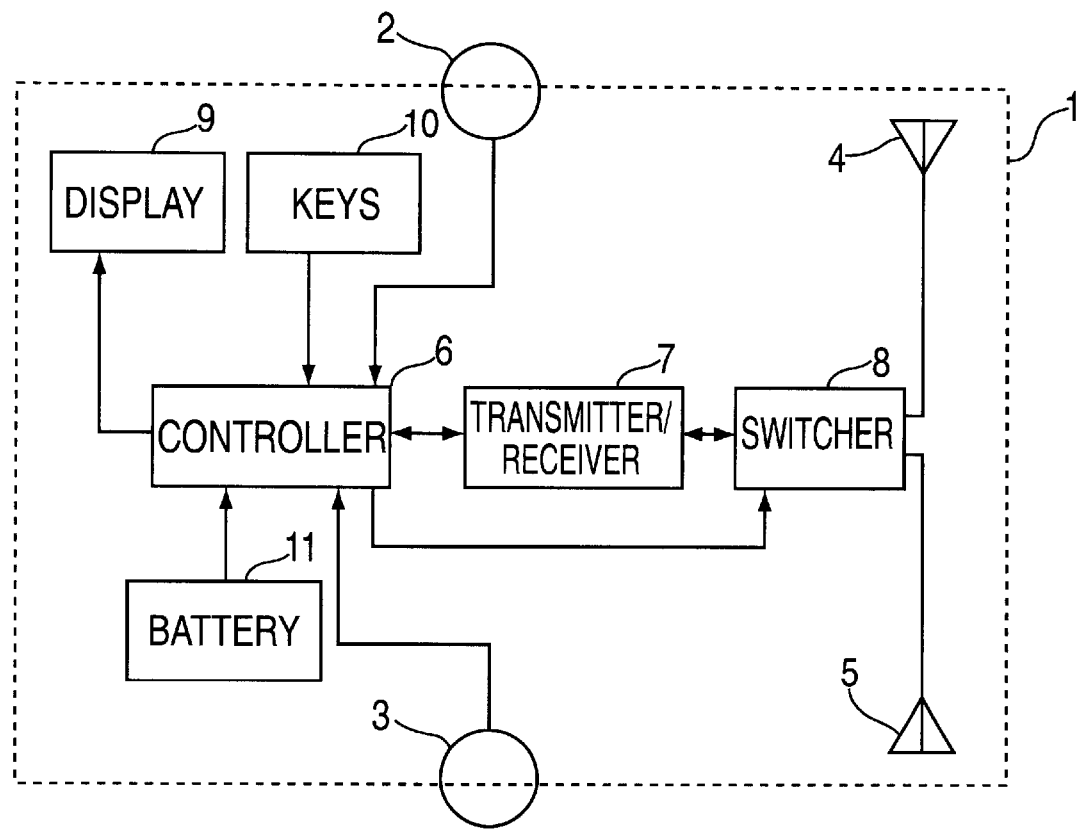
FIG. 2 is a block view showing a circuit configuration of a first embodiment of a portable radio device according to the present invention.

Hereinafter, an embodiment of the present invention will be described with reference to the drawings.

A portable radio device of this embodiment has a device housing 1 made of a synthetic resin in a box shape including two opposing wide rectangular surfaces A, B and elongated four side surfaces for connecting the edges of the two surfaces A and B; two sensors 2, 3 each provided near the two rectangular side surfaces A, B inside the device housing 1; transmit-receive antennas 4, 5; control unit 6 for controlling each component of the device; transmit-receive unit 7 for processing transmission signals from radio communication; switching unit 8 for selectively switching antennas 4, 5 to be connected to transmit-receive unit 7; display device 9 such as an LDC (liquid crystal device) for displaying time or various messages; manipulation unit 10 such as ten keys for performing dial input upon transmission and various inputs through keys; and battery unit 11.

Figure 3:
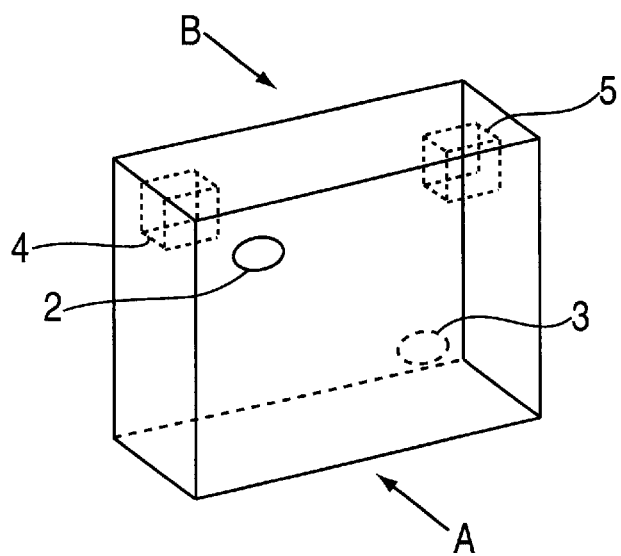
FIG. 3 is a perspective view showing the appearances of the portable radio device in FIG. 2.

Device housing 1 is carried, for example, being held in a dedicated holding case (not shown) and attached on a belt of cloth or the like. When the communication device is fitted, device housing 1 is disposed in the state that one of the two wide surfaces of device housing 1, i.e. either A surface or B surface in FIG. 3 is close to a human body while the other surface is at a distance from the human body. Although typically it is not specified which surface is close to the human body, it is assumed that the surface A at a distance from the human body is the front surface, and the surface B closer to the human body is the back surface.

The sensor comprises one of an optical sensor, strain sensor, and a temperature sensor or a combination of the two or more of the above sensors. Each of sensors 2, 3 in this embodiment comprises a reflection-type photocoupler which combines a light emitting device such as an light emitting diode and a light detection device such as a phototransistor, for example. If an intercepting object exists on the front surface or the back surface of device housing 1, the light emitted from the light emitting device is reflected on the intercepting object and the reflected light is detected by the photo-detection device to thereby detect the existence of the intercepting object.

It should be noted that sensors 2 and 3 are symmetrically disposed away from each other on respective diagonals of the front surface A and the back surface B and the housing case (not shown) is provided with openings in the positions corresponding to sensors 2, 3 respectively.

Transmit-receive antennas 4, 5 are respectively disposed on the front surface and the back surface of device housing 1 in the state of having certain directivity in directions opposite to each other. More specifically, antenna 4 has a directivity in the front surface A direction of the device housing 1 while antenna 5 has a directivity with respect to the back surface B of the device housing 1.

Switching unit 8 selectively connects transmit-receive antenna 4 or 5 to transmit-receive unit 7 with a control signal from control unit 6. Switching unit 8 comprises, for example, a flip-flop and the like and its state is switched by a pulse signal being applied thereto from control unit 6 as the control signal to select transmit-receive antenna 4 or 5.

Control unit 6 includes a CPU, RAM, or ROM and so on and performs the entire control for the device such as the communication control upon transmission or reception and the input/output control to and from display device 9 or manipulation unit 10 based on a predetermined program. Also, control unit 6 receives the detection signals from sensors 2, 3 through signal lines 2a, 2b to select antenna 4 or 5 which are selected based on both of the detection signals. In accordance with the result of the selection, control unit 6 outputs the control signal through signal line 6a to control switching unit 8, thereby selecting antenna 4 or 5.

Next, the operation of this embodiment will be described.

Figure 4:
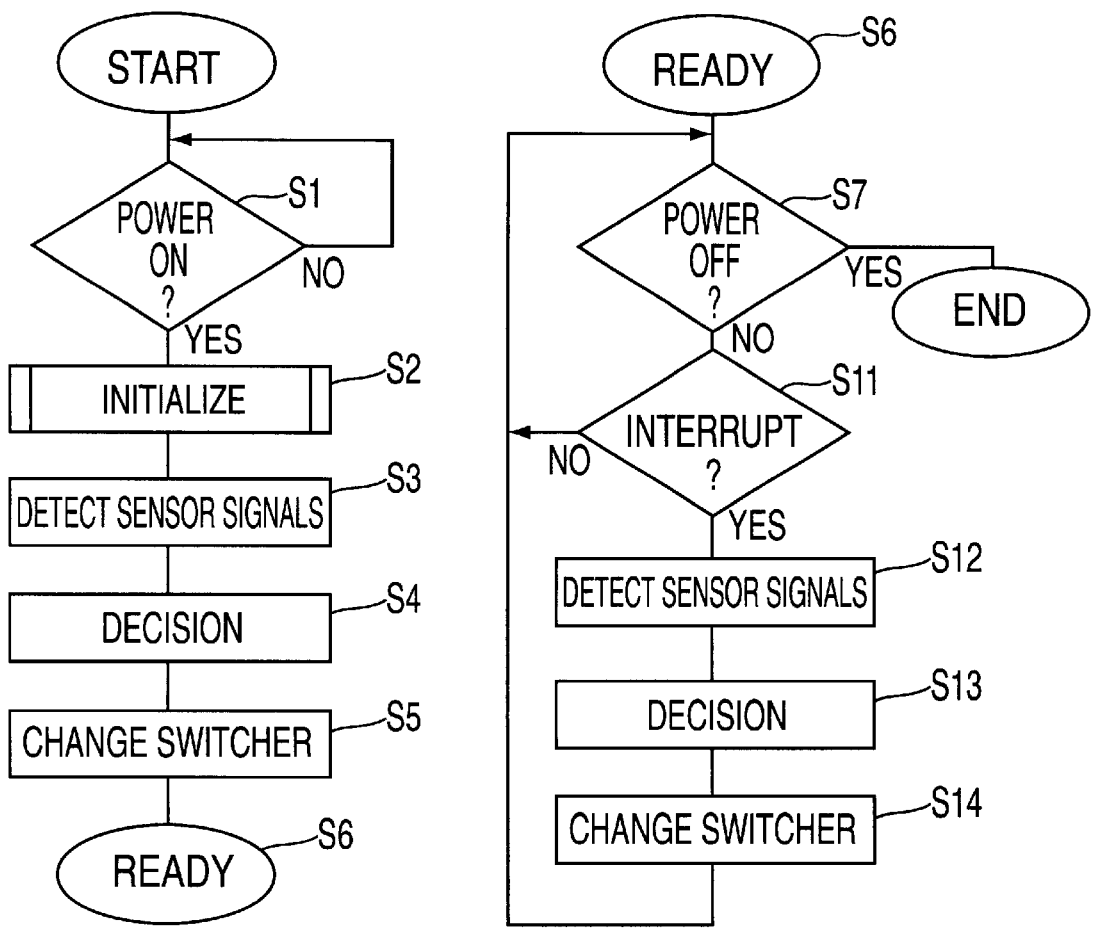
FIG. 4 is a flow chart illustrating an operation of a control unit for selecting an antenna.

Referring to FIG. 4, first, with the manipulation of an electric power switch in manipulation unit 10, the portable radio device is powered on (step (S) 1).

Control unit 6 performs the initial setting for the respective components of the device (S2), receives the detection signals from sensors 2, 3 (S3), and determines which sensor is detecting the intercepting object (S4). Control unit 6 then set the initial state of switching unit 8 in accordance with the detected states of the respective sensors (S5).

In particular, control unit 6 controls switching unit 8 such that antenna 5 and transmit-receiver unit 7 are connected when only sensor 2 detects the intercepting object while antenna 4 and transmit-receiver unit 7 are connected when only sensor 3 detects the intercepting object.

When both sensors 2, 3 detect the intercepting object, or when none of sensors 2, 3 detect the intercepting object, antenna 4 and transmit-receiver unit 7 are connected as a default state.

When the switching of the antennas is finished, the device proceeds to a stand-by state for supporting the next transmission operation or reception operation (S6).

When the transmission operation or reception operation is started next, the above-described operations are performed. However, these operations themselves are similar to those of the prior art so that the description thereof is omitted.

When the manipulation of the electric power switch turns the power off in the stand-by state, the operation is terminated (S7).

In the stand-by state, control unit 6 performs interrupt operations to sensors 2, 3 at certain time intervals (S11), receives the detection signals from sensors 2, 3 (S12), and determines which sensor is detecting the intercepting object (S13). It should be noted that in this embodiment, the interrupt operation is performed only in the stand-by state and not performed when the transmission operation or reception operation is being executed.

Control unit 6 transmits the switching signal to switching unit 8 in accordance with the detected states of respective sensors 2, 3.

Figure 5:
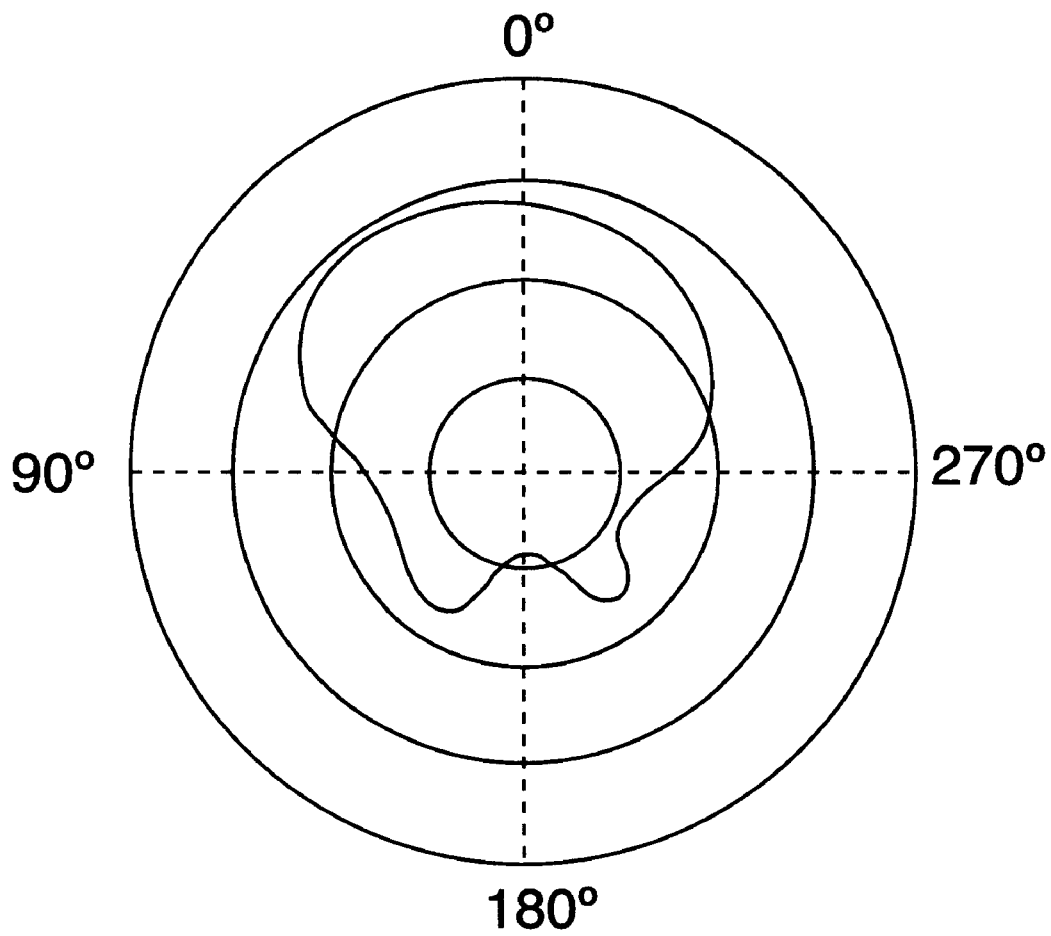
FIG. 5 is an explanatory view for an specific example of an incident power pattern of the transmitted radio wave of the portable radio device when fitted to a human body.

FIG. 5 shows a specific example of the incident power pattern of the transmission power when the portable radio device as described above is fitted to a human body. FIG. 1 shows a specific example of the incident power pattern of the transmission power of the prior art device using a single antenna.

In FIG. 5 and FIG. 1, assuming that the portable radio device is fitted on the front of the human body, for example on the left breast, 0(indicates the front direction of the human body, 90(the left direction, 180(the back direction, and 270(the right direction.

As shown in FIG. 5, the portable radio device of this embodiment obtains a strong incident power pattern in the front direction in which the interference of the human body is not subjected, thereby enabling an efficient transmission of the transmission signal. Also, the similar effect can be obtained in terms of the reception sensitivity.

On the other hand, in the conventional portable radio device, as shown in FIG. 1, proper directivity in accordance with the fitting direction can not be obtained and the incident power is suppressed by the interference of the human body. Therefore, the transmission level is attenuated to prevent proper transmission. Additionally, the reception sensitivity is similarly deteriorated.

It should be noted that although the interrupt operation is periodically performed in the stand-by state to select antenna 4 or 5 in the above-mentioned example, the interrupt operation may be omitted and the selection operation for antennas 4, 5 performed, for example when the transmission operation is started or through other key manipulations. With this selection of operation, the periodical operation of control unit 6 can be omitted to alleviate the load on control unit 6.

Additionally, it should be noted that although two transmit-receive antennas 4, 5 and sensors 2, 3 are respectively provided on the wide surfaces of the device housing 1 in this embodiment, the device may be a configuration having three or more transmit-receive antennas and sensors provided on the surfaces including other surfaces.

Furthermore, the present invention is applied not only to the device in which the communication device performs both transmission and reception, but also to the communication device which performs either transmission or reception.

It is to be understood that variations and modifications of the portable radio device disclosed herein will be evident to those skilled in the art. It is intended that all such modifications and variations be included within the scope of the appended claims.

What is claimed is:

1. A portable radio device comprising:

a radio communication unit for processing an information signal transmitted by radio waves:

a device housing for holding said radio device and removably fitted to a mobile body;

a plurality of antennas dispersedly disposed at positions away from one another in said device housing;

a plurality of sensors provided corresponding to said plurality of antennas respectively for detecting an object close to said device housing; and a switching circuit for comparing detection results of said respective sensors and selectively switching one of said antennas to be connected to said radio communication unit wherein said switching circuit receives detection outputs from said plurality of sensors, determines the fitting surface of said device housing in contact with the mobile body, and selects one of said antennas corresponding to the fitting surface when said radio communication unit is started.

2. The portable radio device according to claim 1, wherein the mobile body is a human body and said device housing is fitted to a portion of the human body through a fitting tool.

3. The portable radio device according to claim 1, wherein said radio communication unit includes one of a transmit-receive section, transmission section, and a reception section.

4. The portable radio device according to claim 1, wherein said device housing is of one thick rectangular plate shape and both widest front surface and back surface are respectively formed as a fitting surface to be contact with the mobile body, and two antennas and two sensors are respectively disposed on each of the fitting surfaces.

5. The portable radio device according to claim 1, wherein said sensor includes a combination of any one or more of an optical sensor, a strain sensor, and a temperature sensor.

6. The portable radio device according to claim 1, wherein said switching circuit periodically receives the detection outputs from said plurality of sensors at certain time intervals, determines the fitting surface of said device housing in contact with the mobile body, and selects one of said antennas corresponding to the direction of the fitting surface.

7. The portable radio device according to claim 1, wherein said switching circuit receives the detection outputs from said plurality of sensors when an indication input is received, determines the fitting surface of said device housing in contact with the mobile body, and selects one of said antennas corresponding to the direction of the fitting surface.

* * * * *